(12) United States Patent
David et al.

(10) Patent No.: US 8,629,794 B2
(45) Date of Patent: Jan. 14, 2014

(54) INTEGRATED CIRCUIT AND SYSTEM INCLUDING CURRENT-BASED COMMUNICATION

(75) Inventors: Thomas Saroshan David, Austin, TX (US); Bradley Martin, Austin, TX (US); Sebastian Ahmed, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 26 days.

(21) Appl. No.: 13/407,730

(22) Filed: Feb. 28, 2012

(65) Prior Publication Data

US 2013/0222165 A1 Aug. 29, 2013

(51) Int. Cl.
*H03M 1/66* (2006.01)

(52) U.S. Cl.
USPC .......................................... 341/144; 341/122

(58) Field of Classification Search
USPC .................................. 341/144, 122, 142, 155
See application file for complete search history.

(56) References Cited

U.S. PATENT DOCUMENTS

| | | | |
|---|---|---|---|
| 6,703,848 B2 * | 3/2004 | Cho | 324/678 |
| 7,266,170 B2 * | 9/2007 | Matsunami et al. | 375/376 |
| 7,697,601 B2 * | 4/2010 | Mansuri et al. | 375/229 |
| 7,764,213 B2 * | 7/2010 | Bartling et al. | 341/152 |

* cited by examiner

*Primary Examiner* — Peguy Jean Pierre
(74) *Attorney, Agent, or Firm* — Cesari & Reed LLP; R. Michael Reed

(57) ABSTRACT

An integrated circuit includes a current-based digital-to-analog converter (IDAC) including a clock input and including an output. The integrated circuit further includes a sample synchronization generator to provide a clock signal to a clock output terminal and a first timing signal related to the clock signal to the clock input of the IDAC. The sample synchronization generator controls the clock signal and the first timing signal to communicate a control signal to a peripheral module.

20 Claims, 2 Drawing Sheets

US 8,629,794 B2

INTEGRATED CIRCUIT AND SYSTEM INCLUDING CURRENT-BASED COMMUNICATION

FIELD

The present disclosure is generally related to integrated circuits, and more particularly to circuits configured to communicate data between a controller and one or more peripheral devices.

BACKGROUND

Integrated circuits that include micro controller units (MCUs) typically include circuitry that is coupled to and that communicates with a plurality of peripheral devices. Such peripheral devices can include data input devices, such as cameras or scanners, sensors, or other input devices. The MCU can drive operation of the peripheral device by providing signals to the peripheral device. In some instance, the MCU may also provide a clock signal to the peripheral device to synchronize its operation to one or more MCU-controlled processes.

SUMMARY

In an embodiment, an integrated circuit includes a current-based digital-to-analog converter (IDAC) including a clock input and including an output. The integrated circuit further includes a sample synchronization generator to provide a clock signal to a clock output terminal and a first timing signal related to the clock signal to the clock input of the IDAC. The sample synchronization generator controls the clock signal and the first timing signal to communicate a control signal to a peripheral module.

In another embodiment, an integrated circuit includes a sample synchronization generator to generate a first timing signal and a micro controller unit (MCU) including an output. The MCU generates a message for a peripheral device. The integrated circuit further includes a first current-based digital-to-analog converter (IDAC) including an input coupled to the output of the MCU, a clock input to receive the first timing signal and an output coupled to a transmit terminal. The first IDAC is configured to generate a current and to communicate the message to the peripheral device through the transmit terminal in response to the first timing signal.

In still another embodiment, a method includes generating a first timing signal using a signal sample generator and providing the first timing signal to a first input of a current-based digital-to-analog converter (IDAC). The method further includes providing a message for communication to an output terminal from a micro-controller unit (MCU) to a second input of the IDAC and, in response to receiving the first timing signal and the message, generating an output current at an output of the IDAC. The output current is configured to encode the message into a current-based signal.

BRIEF DESCRIPTION OF THE DRAWINGS

In the following discussion, the same reference numerals are used to indicate the same or similar elements in the illustrated embodiments.

DETAILED DESCRIPTION OF ILLUSTRATIVE EMBODIMENTS

Embodiments of an integrated circuit are described below that include a sample synchronization generator (SSG) that is configured to generate a clock signal (synchronous waveform) that can be used to trigger sampling operations of analog-to-digital converters (ADCs) and current-based digital-to-analog converters (IDACs) to provide a current-based communication mechanism between an integrated circuit and one or more peripheral devices. In an example, the SSG provides a clock signal to a peripheral device through a clock terminal and provides a timing signal to the IDAC to encode and communicate messages to the peripheral device. Further, the SSG provides a second timing signal to the ADC to control sampling of a signal received from the peripheral device. The SSG triggers operation of the IDACs and the ADCs and communicates the synchronization information to the peripheral module to provide the current-based communication mechanism.

Figure 1:
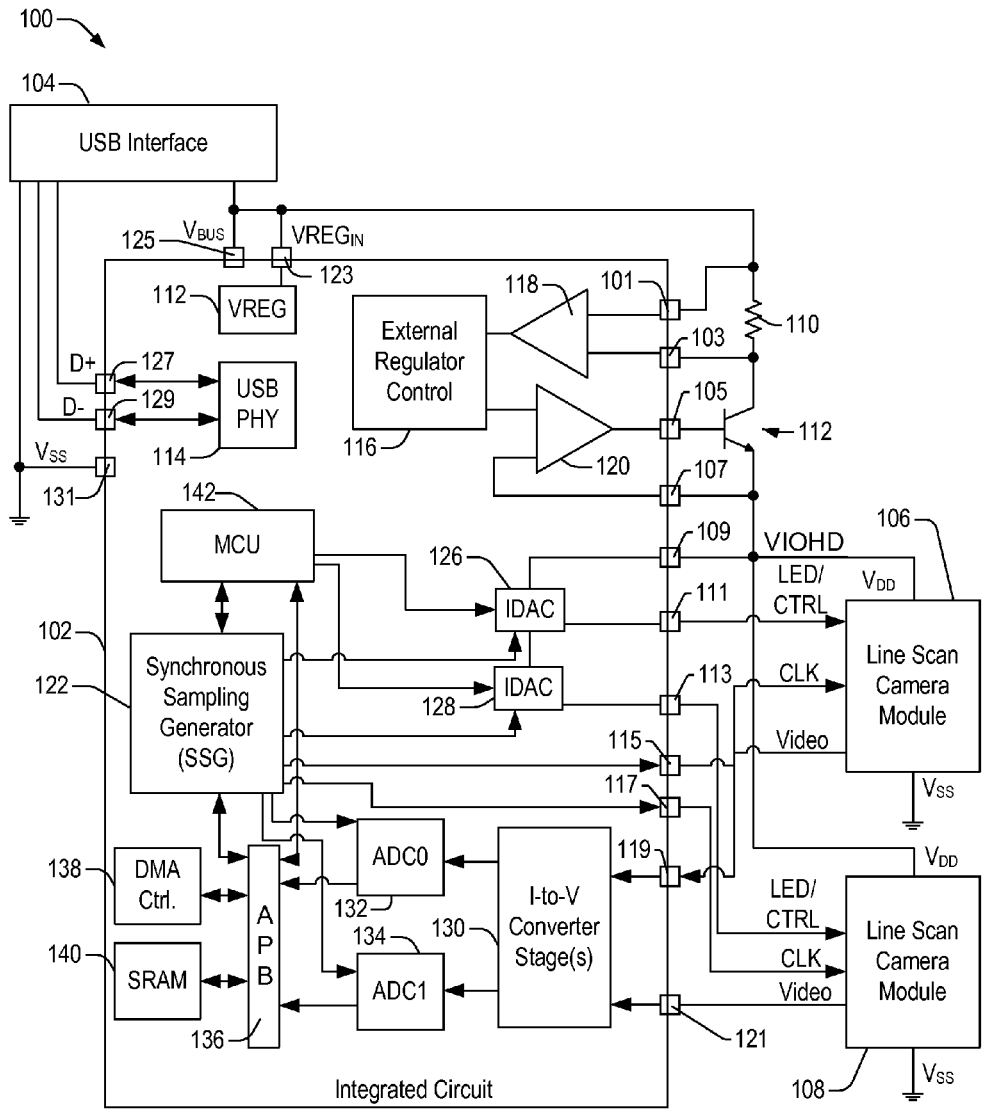
FIG. 1 is a block diagram of a system including current-based communication according to an exemplary embodiment.

FIG. 1 is a block diagram of a system 100 including an integrated circuit 102 having an MCU 142 and a sample synchronization generator (SSG) 122 configured to provide current-based communications with one or more peripheral devices, such as line scan camera modules 106 and 108. Line scan camera modules 106 and 108 are illustrative examples of peripheral devices that can be used in conjunction with circuit 102. In other embodiments, one or more of the camera modules 106 and 108 can be omitted and/or replaced with other devices or circuits. Integrated circuit 102 includes multiple terminals or pads 123, 125, 127, 129, and 131 for coupling the integrated circuit 102 to a universal serial bus (USB) interface 104, which may be coupled to a peripheral device or to a host system. Pad 131 is coupled to ground, and pads 123 and 125 are coupled to a voltage bus. Pads 127 and 129 are coupled to physical transport lines of USB interface 104. Integrated circuit 102 further includes pads 101, 103, 105, 107, 109, 111, 113, 115, 117, 119, and 121. System 100 further includes a resistor 110 including a first terminal coupled to pad 101, and a second terminal coupled to pad 103. System 100 further includes a transistor 112 including a first electrode coupled to pad 103, a control terminal coupled to pad 105, and a second electrode coupled to pad 107.

Line scan camera module 106 includes a supply input coupled to pad 109 and 107, a light-emitting diode (LED) control input coupled to pad 111 (transmit terminal), and a clock input coupled to pad 115. Line scan camera module 106 further includes a video output coupled to pad 119. Line scan camera module 106 is responsive to the LED control input signal to capture line scan data (video data), which is transferred to integrated circuit 102 through pad 119 (receive terminal) in response to pulses of the SSG clock signal at pad 115. Line scan camera module 108 includes a supply input coupled to pad 109 and 107, an LED control input coupled to pad 113, and a clock input coupled to pad 117. Line scan camera module 108 further includes a video output coupled to pad 121. While the above-example relates to communication of video data, other applications are also possible. Transmission of video data is only one of many possible applications.

Integrated circuit 102 includes a voltage regulator 112 coupled to pad 123 and is configured to provide a regulated voltage to on-chip circuitry. Integrated circuit 102 further includes a USB physical layer circuit 114 coupled to pads 127 and 129. USB physical layer circuit 114 communicates data to and from integrated circuit 102 to USB interface 104. Integrated circuit 102 also includes an external regulator control 116 having an input coupled to an output of a differential amplifier 118, which has a first input coupled to pad 101 and a second input coupled to pad 103. External regulator control 116 further includes an output coupled to an input of a differential amplifier 120, which has a second input coupled to pad 107 and an output coupled to pad 105.

Integrated circuit 102 further includes SSG 122 including outputs coupled to pads 115 and 117 and to ADCs 132 and 134 and an input/output (I/O) coupled to an I/O of a micro controller unit (MCU) 142. SSG 122 further includes an output coupled to an input of a current-based digital-to-analog converter (IDAC) 126, which has a second input coupled to an output of MCU 142, and an output coupled to pad 111. SSG 122 also includes another output coupled to an input of an IDAC 128, which has a second input coupled to an output of MCU 142, and an output coupled to pad 113.

Integrated circuit 102 also includes a current-to-voltage (I-to-V) converter stages circuit 130 having inputs coupled to pads 119 and 121 and outputs coupled to ADC circuits 132 and 134. ADC 132 includes a timing control input coupled to an output of SSG 122 for receiving a phase-delayed timing signal. ADC 134 also includes a timing control input coupled to an output of SSG 122 for receiving a phase-delayed timings signal. Each of ADCs 132 and 134 includes an output coupled to an advanced peripheral bus (APB) 136, which is coupled to SSG 122 and to MCU 142. APB 136 is also coupled to a direct memory access (DMA) controller 138 and to a static random access memory (SRAM) 140.

In an example, IDACs 126 and 128 drive signals onto pads 111 and 113, respectively. In an example, IDAC 126 drives a light emitting diode (LED) driver signal to pad 111 and to line scan camera module 106. In another example, IDAC 126 can encode and drive a message from MCU 142 into a current signal for current-based communication of information to line scan camera module 108 (or to another type of peripheral module). In one instance, the message includes cyclic redundancy check (CRC) data. In another instance, the message includes synchronization data for synchronizing the peripheral module to the integrated circuit 102. In another instance, the message includes baud rate information and/or settings, multi-bit symbols, or other encoded information. IDAC 128 drives an LED driver signal to pad 113 and to line scan camera module 108. Similar to IDAC 126, IDAC 128 can encode and communicate messages from MCU 142 into a current-based message that can be provided to a peripheral module, such as line scan camera module 108. SSG 122 controls timing of the IDACs 126 and 128 to communicate messages and data to peripheral modules.

SSG 122 controls sample timing of ADCs 132 and 134 to perform synchronized interleaved sampling. SSG 122 further includes logic for generating a clock signal for external devices, such as line scan camera modules 106 and 108, which clock signal is provide to pads 115 and 117 and which is synchronized to the internal sampling clock used by one or both ADCs 132 and 134 and to the current-based signals provided by IDACs 126 and 128. Thus, SSG 122 and MCU 142 cooperate to use IDACs 126 and 128 and ADCs 132 and 134 to provide a current-based communication mechanism between the integrated circuit 102 and one or more peripheral modules.

In a particular embodiment, SSG 122 controls ADCs 132 and 134 to perform interleaved sampling of the same input, which can provide a sample rate of twice that of each individual ADC 132 or 134. SSG 122 can similarly control IDACs 126 and 128 to perform interleaved transmission of message data either through two outputs or by modulating the data into different channels on the same output. For example, in an implementation where ADCs 132 and 134 are capable of one mega-sample per second (MSPS) rates, SSG 122 can control ADCs 132 and 134 to perform interleaved, 2 MSPS sampling of the same input.

In general, integrated circuit 102 can communicate with any peripheral module that is capable of current-based communications. In some instances, an external resistor tree may be included to convert the current-based signal from the IDACs 126 and 128 into representative voltages for direct conversion by ADCs in a peripheral module. By utilizing the current-driver circuitry to encode messages and to synchronize the peripheral module to integrated circuit 102, an integrated, current-based communication mechanism is achieved which can be implemented without external timers, programmable counter arrays, or other circuitry.

In another example, control logic for generating interrupt service requests can be duplicated to convert a signal sent to other into a synchronization control. Either or both of IDACs 126 and 128 and ADCs 132 and 134 can be configured to use this signal as a "conversion start" command, synchronizing communication with one or more peripheral devices. Using the SSG clock signal makes it possible to synchronize peripheral devices, such as line scan camera modules 106 and 108, to timing of integrated circuit 102 without additional pads or pins and without having to synchronize the integrated circuit 102 to external clocks.

Line scan camera modules 106 and 108 represent one possible example of a peripheral device or module that can couple to integrated circuit 102. In other implementations, other types of peripheral devices may be coupled to integrated circuit 102 instead of or in addition to a line scan camera module.

Figure 2:
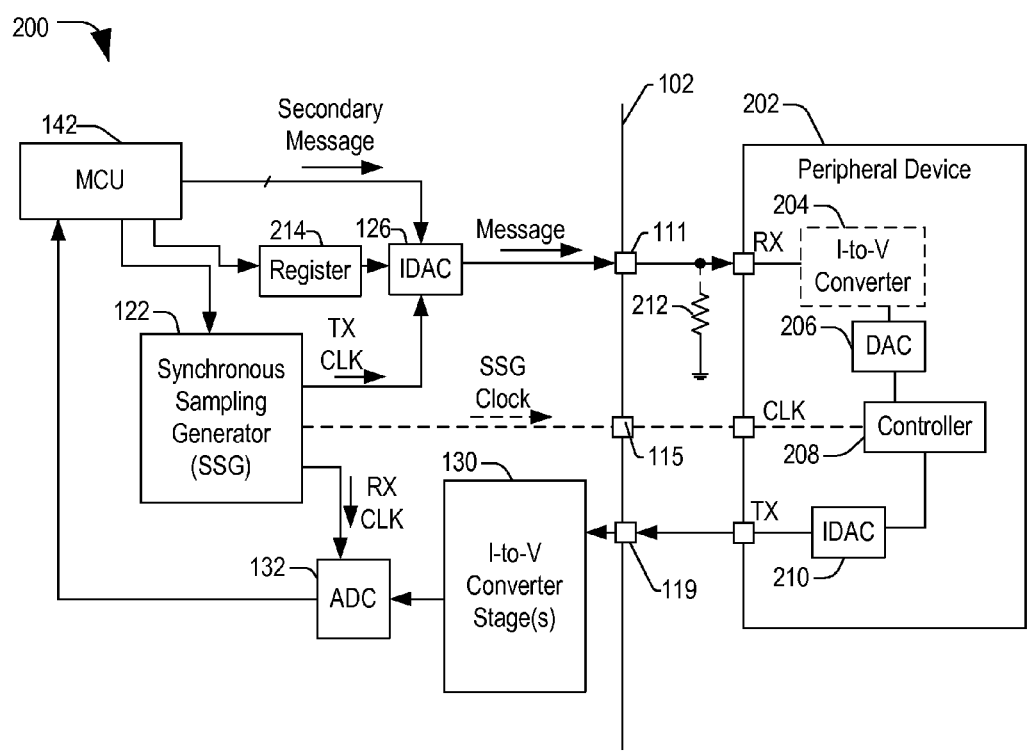
FIG. 2 is a block diagram of a portion of the system of FIG. 1 including circuitry configured to provide current-based communications according to an exemplary embodiment.

FIG. 2 is a block diagram of a system 200 representing a portion of the system 100 of FIG. 1 including the MCU 142 and the SSG 122 and including circuitry configured to provide current-based communications with a peripheral device 202. Peripheral device includes a current-to-voltage converter 204 having an input coupled to pad 111 and an output coupled to an input of a DAC 206. DAC 206 includes an output coupled to a controller 208. Controller 208 includes an output coupled to an input of an IDAC 210, which has an output coupled to pad 119. In some instances, current-to-voltage converter 204 can be omitted and replaced with an external resistor network, which in this illustrated example is represented by resistor 212 having a first terminal coupled to pad 111 and a second terminal coupled to ground.

Integrated circuit 102 includes a transmit pad 111 and a receive pad 119 for coupling to peripheral device 202, such as a linear image sensor. Integrated circuit 102 further includes IDAC 126 having a clock or timing input coupled to an output of SSG 122 and output coupled to transmit pad 111. Current-to-voltage converter 130 includes an input coupled to the receive pad 119 and an output coupled to one of the ADCs (ADC 132), which has a control input coupled to an output of the SSG 122 and an output coupled to MCU 142. SSG 122 generates a synchronous waveform that triggers ADC 132 and a clock waveform that is used as a communication clock (communicated to peripheral device 202 through pad 115) and that can also be used to trigger the iDAC 126, providing a synchronous trigger mechanism which can be used to provide current-based communications between integrated circuit 102 and peripheral device 202.

Integrated circuit 102 includes a register 214 including an input coupled to MCU 142 and an output coupled to an input of IDAC 126. In an example, MCU 142 can load data into register 214 and SSG 122 clocks the data into IDAC 126 to communicate the data to peripheral device 202. In some instances, MCU 142 can provide messages, data or settings to register 214 for communication to peripheral device 202. Alternatively, MCU 142 can provide a secondary message directly to IDAC 126, which can encode and communicate the message to peripheral device 202. In one instance, the message may be communicated asynchronously to peripheral device 202. In another instance, SSG 122 provides an SSG clock signal to peripheral device 202 through pad 115, which SSG clock signal synchronizes peripheral device 202 to integrated circuit 102.

In conjunction with the systems and circuit described above with respect to FIGS. 1-2, a circuit includes an IDAC having an output coupled to a transmit pad, a timing input, and a data input. The circuit further includes an MCU to provide a message to the data input, and an SSG to provide a timing signal to the timing input. The SSG may also provide an SSG clock signal to a clock pad, which can be coupled to a peripheral device. In operation, the SSG controls timing of the IDAC transmissions by using the timing signal as a synchronous trigger mechanism and by using the clock signal to communicate the synchronization to the peripheral device to provide a current-based, synchronous communication mechanism. Further, the SSG can provide a second timing signal to a DAC to control timing of the sampling performed by a DAC, providing synchronous communication from the peripheral device to the integrated circuit.

Although the present invention has been described with reference to preferred embodiments, workers skilled in the art will recognize that changes may be made in form and detail without departing from the spirit and scope of the invention.

What is claimed is:

1. An integrated circuit comprising:
   a current-based digital-to-analog converter (IDAC) including a clock input and including an output; and
   a sample synchronization generator to provide a clock signal to a clock output terminal and a first timing signal related to the clock signal to the clock input of the IDAC, the sample synchronization generator to control the clock signal and the first timing signal to communicate a control signal to a peripheral module.

2. The integrated circuit of claim 1, wherein the control signal comprises synchronization data.

3. The integrated circuit of claim 1, wherein the control signal comprises cyclic redundancy check (CRC) data.

4. The integrated circuit of claim 1, wherein the sample synchronization generator further controls the IDAC to provide a driver signal to the peripheral module.

5. The integrated circuit of claim 1, further comprising:
   a microcontroller unit (MCU) including an output coupled to a data input of the IDAC and configured to provide a message for transmission to the peripheral module; and
   wherein the IDAC encodes the message to produce the control signal.

6. The integrated circuit of claim 5, further comprising:
   a current-to-voltage converter including an input coupled to a receive terminal configurable to couple to the peripheral module, and including an output; and
   an analog-to-digital converter (ADC) including an input coupled to the output of the current-to-voltage converter and including an output coupled to an input of the controller.

7. The integrated circuit of claim 6, further wherein the ADC further includes a clock input responsive to a second timing signal from the sample synchronization generator to sample a signal at the output of current-to-voltage converter.

8. The integrated circuit of claim 1, further comprising:
   a second IDAC including a clock input and including an output coupled to a second transmit terminal configurable to couple to a second peripheral device; and
   wherein the second IDAC is responsive to a second timing signal from the sample synchronization generator to provide a second control signal to the second peripheral device.

9. An integrated circuit comprising:
   a sample synchronization generator to generate a first timing signal;
   a microcontroller unit (MCU) including an output, the MCU to generate a message for a peripheral device; and
   a first current-based digital-to-analog converter (IDAC) including an input coupled to the output of the MCU, a clock input to receive the first timing signal, and an output coupled to a transmit terminal, the first IDAC configured to generate a current and to communicate the message to the peripheral device through the transmit terminal in response to the first timing signal.

10. The integrated circuit of claim 9, wherein the message comprises a symbol including multiple bits.

11. The integrated circuit of claim 9, wherein the message comprises synchronization data.

12. The integrated circuit of claim 9, wherein the message comprises cyclic redundancy check (CRC) data.

13. The integrated circuit of claim 9, further comprising a current-to-voltage converter including an input coupled to a receive terminal, and an output.

14. The integrated circuit of claim 13, further comprising an analog-to-digital converter including an input coupled to the output of the current-to-voltage converter, and including an output coupled to an input of the MCU.

15. A method comprising:
   generating a first timing signal using a signal sample generator;
   providing the first timing signal to a first input of a current-based digital-to-analog converter (IDAC);
   providing a message for communication to an output terminal from a micro-controller unit (MCU) to a second input of the IDAC; and
   in response to receiving the first timing signal and the message, generating an output current at an output of the IDAC, the output current configured to encode the message into a current-based signal.

16. The method of claim 15, further comprising:
   synchronously triggering operation of the IDAC using the first timing signal; and
   communicating synchronization information to a clock terminal configurable to couple to a peripheral module.

17. The method of claim 15, further comprising:
   converting an input signal at a receive terminal into a voltage signal using a current-to-voltage converter;
   converting the voltage signal into a digital signal using an analog-to-digital converter coupled to a micro-controller unit (MCU).

18. The method of claim 17, further wherein:
   generating a second timing signal using the sample synchronization generator; and
   controlling timing of sampling of a signal by the analog-to-digital converter using the second timing signal.

19. The method of claim 15, wherein the message comprises synchronization data.

20. The method of claim 15, wherein the messages comprises cyclic redundancy check (CRC) data.

* * * * *